United States Patent
Paxton et al.

(10) Patent No.: US 6,584,743 B2
(45) Date of Patent: Jul. 1, 2003

(54) DECORATIVE SKIRTING (BASE) BOARD OR CROWN MOLDING

(75) Inventors: David Paxton, Doncaster (GB); Steven K. Lynch, St. Charles, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 09/871,114

(22) Filed: May 31, 2001

(65) Prior Publication Data

US 2001/0032432 A1 Oct. 25, 2001

Related U.S. Application Data

(63) Continuation-in-part of application No. 09/716,394, filed on Jan. 16, 2001, which is a continuation-in-part of application No. 09/742,840, filed on Dec. 21, 2000, now abandoned.
(60) Provisional application No. 60/198,709, filed on Apr. 20, 2000.

(51) Int. Cl.$^7$ .................................................. E04C 2/20
(52) U.S. Cl. .......................... 52/312; 52/311.2; 52/313; 52/287.1; 52/717.01; 52/717.04; 52/717.05
(58) Field of Search .............................. 52/287.1, 288.1, 52/718.04, 718.06, 718.03, 717.05, 311.1, 311.2, 312, 313, 717.01, 717.04

(56) References Cited

U.S. PATENT DOCUMENTS

| | | |
|---|---|---|
| 495,465 A | 4/1893 | Silver |
| 800,053 A | 9/1905 | Ayres |
| 1,488,090 A | 3/1924 | Buhr |
| 3,201,909 A | 8/1965 | Grün |
| 3,228,165 A | 1/1966 | Begian |
| 3,638,374 A | 2/1972 | Harby |
| 3,899,859 A | 8/1975 | Smith |
| 4,061,813 A | 12/1977 | Geimer et al. |
| 4,204,376 A | 5/1980 | Calvert |
| 4,337,604 A | 7/1982 | Bürgers |

(List continued on next page.)

FOREIGN PATENT DOCUMENTS

| | | |
|---|---|---|
| DE | 12 10 551 | 2/1966 |
| EP | 0 225 628 A2 | 6/1987 |
| EP | 0 225 629 A2 | 6/1987 |
| EP | 0 688 639 A2 | 12/1995 |
| EP | 1 066 936 | 10/2001 |
| GB | 2 237 040 A | 4/1991 |
| JP | 59 059433 A | 4/1984 |
| WO | WO 99 62680 | 12/1999 |
| WO | WO 01 21369 | 3/2001 |

OTHER PUBLICATIONS

U.S. patent application Ser. No. 09/833,128, Lynch et al., filed Oct. 18, 2001.
U.S. patent application Ser. No. 09/369,810, Pinto et al., filed Feb. 20, 2001.
Panel Fast: Premium Timber Products, Ltd. product. Photos and advertising of "Panel Fast" product offered for sale in the United Kingdom as a wainscot treatment, possibly manufactured by Jeldwen.

*Primary Examiner*—Carl D. Friedman
*Assistant Examiner*—Yvonne M. Horton
(74) *Attorney, Agent, or Firm*—Liniak, Berenato & White,LLC

(57) ABSTRACT

A molded skirting board, crown molding, or other decorative moldings simulating natural wood millwork, and a method of molding a loose cellulosic mat, in a single pressing step, to provide one or more relatively high density, skirting boards without requiring preliminary pressing, or other pre-shaping step, such as scalping. The molded articles are molded in a conventional, multi-opening fiberboard press to produce multiple, interconnected parts in a single pressing step process, while achieving excellent transfer of mold detail (embossing fidelity) without visually noticeable fiber fracture. A corrugated or L-shaped, hidden stiffening/positioning member spaces the article from a wall or ceiling to simulate thick, heavier, natural wood millwork.

35 Claims, 3 Drawing Sheets

U.S. PATENT DOCUMENTS

| | | |
|---|---|---|
| 4,378,265 A | 3/1983 | Kiss |
| 4,552,797 A | 11/1985 | Munk et al. |
| 4,610,900 A | 9/1986 | Nishibori |
| 4,612,224 A | 9/1986 | Davis |
| 4,622,190 A | 11/1986 | Schultz |
| 4,622,791 A | 11/1986 | Cook et al. |
| 4,726,881 A | 2/1988 | Schultz |
| 4,734,236 A | 3/1988 | Davis |
| 4,812,188 A | 3/1989 | Hansen |
| 4,844,968 A | 7/1989 | Persson et al. |
| 4,865,788 A | 9/1989 | Davis |
| 4,960,548 A | 10/1990 | Ikeda et al. |
| 4,960,553 A | 10/1990 | DeBruine et al. |
| 4,969,302 A | 11/1990 | Coggan et al. |
| 5,028,374 A | 7/1991 | Imao et al. |
| 5,090,173 A | 2/1992 | Coggan et al. |
| 5,154,968 A | 10/1992 | DePetris et al. |
| 5,443,891 A | 8/1995 | Bach |
| 5,457,923 A | 10/1995 | Logan et al. |
| 5,543,234 A * | 8/1996 | Lynch et al. .............. 428/537.1 |
| 5,592,797 A | 1/1997 | Logan et al. |
| 5,598,681 A | 2/1997 | DiGianni |
| 5,662,753 A | 9/1997 | Loos |
| 5,694,726 A | 12/1997 | Wu |
| 5,711,123 A | 1/1998 | Lamont et al. |
| 5,851,325 A | 12/1998 | Terada et al. |
| 5,887,402 A * | 3/1999 | Ruggie et al. ................. 52/455 |
| 6,112,481 A | 9/2000 | Schiedegger et al. |
| 6,122,872 A | 9/2000 | Sauter |
| 6,189,276 B1 | 2/2001 | Pinto et al. |

\* cited by examiner

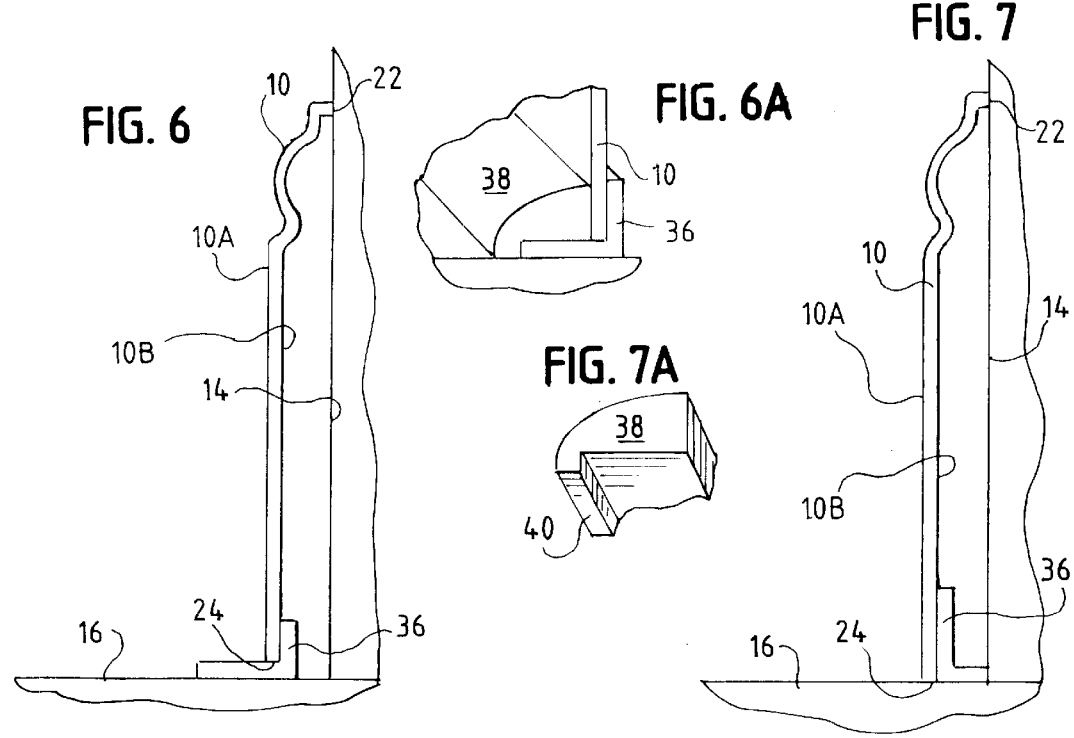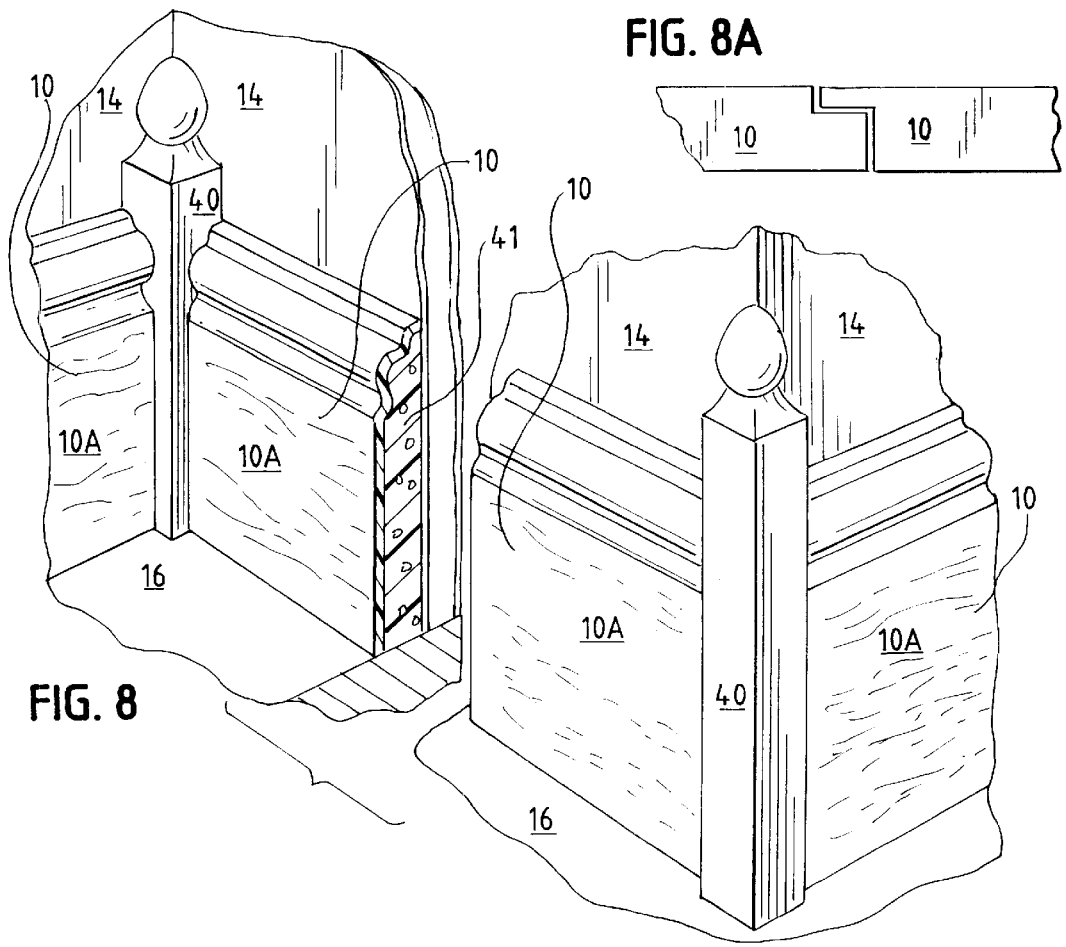

DECORATIVE SKIRTING (BASE) BOARD OR CROWN MOLDING

CROSS-REFERENCE TO RELATED APPLICATION

This application is a continuation-in-part of U.S. application Ser. No. 09/761,394 filed Jan. 16, 2001, which is a continuation-in-part of U.S. application Ser. No. 09/742,840 filed Dec. 21, 2000, now abandoned, which claims priority of U.S. Provisional Patent Application Serial No. 60/198,709 filed Apr. 20, 2000.

FIELD OF THE INVENTION

The present invention relates to molded baseboards or skirting boards, crown moldings, or other architectural molding articles particularly useful as a molding strip disposed adjacent to a room wall, where the wall meets a finished floor (base board) or ceiling (crown molding), and to a method of making the molded wood composite articles. The skirting board includes four embodiments, a corrugated positioning and strengthening member supporting a molded outer profile that is secured to the wall or floor; a single piece of molded decorative board with separate hardware that is fastened to the wall; a one part laminate fastened to existing baseboard on a wall; and molded skin foam filled on the back side to conform to the wall. More particularly, in the preferred embodiment, both the corrugated positioning and strengthening member, and the skirting board disposed thereover, are made from a cellulosic mat containing a combination of cellulosic fibers, preferably including species of Pine, or Sitka Spruce, and mixed hardwoods, such as maple and oak, with Pine or Fir including at least about 30% by weight, preferably at least about 60%, softwood fibers, (from trees that produce cones) such as all species of pine and fir, e.g., Southern Pine, based on the total dry fiber weight, and a natural or synthetic binder, such as a phenol formaldehyde, melamine formaldehyde, or urea formaldehyde resin. The cellulosic mat includes at least about 80% refined, fibrillated cellulosic fibers, e.g., a fiberboard mat, such as that hot-pressed to produce hardboard. The upper surface of the decorative facing board has excellent molding die fidelity and may have a smooth finish or may be embossed to simulate a wood grain pattern, such as oak, simulating furniture grade natural wood. The articles are molded from a planar layer or mat of cellulosic fibers and a binder, e.g., a fiberboard mat, made either by the wet process or the dry process, preferably the dry process. In a preferred embodiment, the fiberboard mat is one to three inches in thickness before molding, and after molding is ⅛ to ¼ inch in thickness.

BACKGROUND OF THE INVENTION

Man-made boards, such as fiberboard, e.g., hardboard, commonly are embossed on their intended visible major outer surface in the manufacture of interior paneling, exterior siding, and the like. There are numerous examples of skirting boards made from natural wood, wood veneer or plastic coated wood, sheet metal, extruded plastic, e.g., PVC, or medium density fiberboard, as disclosed in the following U.S. Patents. Pinto et al., U.S. Pat. No. 6,189,276 B1; Grün, U.S. Pat. No. 3,201,909; DiGianni U.S. Pat. No. 5,598,681; Sauter, U.S. Pat. No. 6,122,872; Silver, U.S. Pat. No. 495,465; Ayres, U.S. Pat. No. 800,053; Buhr, U.S. Pat. No. 1,488,090; Begian, U.S. Pat. No. 3,228,165; Harby, U.S. Pat. No. 3,638,374; and Smith U.S. Pat. No. 3,899,859. Pinto et al. U.S. Pat. No. 6,189,276 B1 discloses a natural wood skirting board adapted to be nailed directly over an existing skirting board, and Smith, U.S. Pat. No. 3,899,859 discloses brackets that are attachable to a top of an existing skirting board so that vertical and/or horizontal ribs, extending from a plastic or metal skirting board, can be secured to the existing skirting board. The other cited U.S. patents are directed to originally installed skirting boards, and generally include complicated support structure including horizontal and/or vertical ribs, for maintaining the outer decorative skirting board spaced from the wall. Further, many of such skirting boards are produced from natural wood, which is expensive, heavy, and require cutting and routing, or from a medium density fiberboard (MDF), which is not only relatively heavy, but also requires cutting and machining from a relatively thick piece, e.g. ½" thick, to provide a desired decorative shape (profile), and the cut and machined profiled surfaces of the MDF then must be sealed to prevent fibers from protruding from the machined surfaces when coated and, substantially increasing the cost.

In accordance with the present invention, relatively thin, decorative, contoured, molded cellulosic fiber/binder composite articles, such as skirting boards, are manufactured by pressing a mat of cellulosic fibers and binder in a suitably shaped mold to produce multiple composite articles from the fiber mat, and the multiple composite articles, e.g., skirting boards, which are interconnected after molding, are easily separated, one from the other, to provide multiple skirting boards that are light weight, strong, can be embossed to replicate natural wood grain patterns during molding, and do not require cutting, machining, or sealing, other than to separate the multiple composite articles produced in the mold.

SUMMARY OF THE INVENTION

In brief, the present invention is directed to molded, decorative composite wood articles, such as skirting boards, and to a method of making multiple molded composite wood articles, e.g., skirting boards, in a single pressing step. In the preferred embodiment, the molded articles are adapted to be disposed adjacent to a wall or ceiling, e.g., where the wall meets a finished floor or ceiling, or at a mid wall chair rail location. The molded wood composite articles are produced by molding a loose cellulosic mat, in a single pressing step, to provide one or more relatively high density profile millwork lengths without requiring preliminary pressing, or other pre-shaping step, such as scalping. The molded wood composite articles are molded in a conventional, multi-opening fiberboard press, in a single pressing step process, while achieving excellent transfer of mold detail (embossing fidelity) without visually noticeable fiber fracture. The articles can include a foil, an in-press paper overlay, or thermoplastic coating materials but do not require an overlay or high resin content coating to achieve excellent embossing fidelity and appearance. Advantageously, multiple wood composite articles that are interconnected in pressing, but easily separated, are manufactured in a single pressing operation. Secondary operations may include membrane operation, vinyl film wrapped, ground coated ready for staining, and primed for solid color paints.

In the preferred embodiment, the loose cellulosic mat that is molded is manufactured by the dry process to provide a smooth, planar back surface or contoured back of the raised, molded profile, rather than a screen back pattern which results from pressed mats made by the wet process. The molded architectural design provides a decorative outer surface that is sharp and crisp with sharp detail in any decorative design and has the appearance and feel of hand crafted natural wood millwork, but actually is a molded, high density wood composite material that can be secured to a planar wall, such as gypsum wallboard, through a variety of positioning members, as disclosed in more detail hereinafter.

Accordingly, one aspect of the present invention is to provide molded, wood composite articles, e.g., skirting boards, and a method of manufacturing the articles, wherein the articles are molded into a pressed sheet of multiple articles from a loose mat of cellulosic fiber and binder, such that the articles have a decorative outer surface that simulates natural wood millwork.

Another aspect of the present invention is to provide molded, wood composite articles, e.g., skirting boards, and a method of manufacturing the articles, and including a wall positioning member to position the articles spaced from the wall, such that the articles are light weight, but appear to be thick, solid wood millwork, and can be securely adhered to any planar surface, such as a gypsum wallboard, or plaster wall, while providing sharp, crisp embossing fidelity on the outer surface of the molded articles to simulate natural wood, handcrafted millwork.

Another aspect of the present invention is to provide a skirting board kit comprising a plurality of molded wood composite decorative, outer skirting board members and a plurality of inner positioning/strengthening members adapted to position and strengthen the skirting board, for securing the skirting board to a wall or ceiling. In one embodiment, the inner positioning/strengthening member can be a rigid foam, such as a polyurethane foam, that fills a space between the back surface of the skirting board and the wall or ceiling.

Still another aspect of the present invention is to provide a molded wood composite decorative article that provides for exact transferring of mold detail at exterior surfaces and contours in a single pressing operation without requiring multiple press steps, post mold curing at elevated temperatures, or a high resin content (5–25% by weight) outer surface portion.

Another aspect of the present invention is to provide a molded skirting board or other molded, decorative wood composite article that can be molded from cellulosic mats that do not require synthetic fibers, scrim surfaces, layering of short and long fibers, resin-impregnated paper overlays, or needling (needle punching) to hold a loose cellulosic mat together prior to molding.

A further aspect of the present invention is to provide a molded wood composite article, such as a skirting board, secured to a wall, that provides a space between the skirting board and the wall adapted to receive, and hide from view, conduit, electrical wires, and the like for plumbing and/or electrical connections.

Still another aspect of the present invention is to provide molded wood composite articles that can be molded in a strip of multiple parts in a single pressing (molding) operation and can be separated into individual moldings after pressing and then coated with a water-based and/or solvent-based coating material, e.g., paint or stain, without surface defects, such as knots or splits, in the outer surface.

The above and other aspects and advantages of the present invention will become more apparent from the following detailed description of the preferred embodiments, taken in conjunction with the drawings.

BRIEF DESCRIPTION OF THE DRAWINGS

FIG. 6 is a side view of the molded, wood composite article of FIG. 1 adhered to drywall using an L-shaped strengthening/positioning member;

FIG. 6A is a partially broken-away perspective view of a notched or routed quarter round molding member useful, together with the L-shaped strengthening/positioning member shown in FIG. 6, to hide the L-shaped strengthening/positioning member from view (one of many embodiments).

FIG. 7 is a side view of the molded, wood composite article of FIG. 1 adhered to drywall using the L-shaped strengthening/positioning member of FIG. 6, shown in an alternative position, against a wall, so that the quarter round molding of FIG. 6A is unnecessary;

FIG. 7A is a partially broken-away perspective view of the notched or routed quarter round molding member of FIG. 6A;

FIG. 8 is a partially broken-away perspective view showing wood grain-embossed composite wood skirting boards, having a rigid foam filler disposed between the back surface of the skirting boards and the wall, butted against an inside corner block and an outside corner block that can be molded as part of a skirting board kit, or the corner blocks are commercially available in natural wood; and FIG. 8A is a partially broken-away perspective view showing a shiplap juncture between ends of two adjacent composite wood skirting boards of the present invention.

BRIEF DESCRIPTION OF THE PREFERRED EMBODIMENTS

Figure 2:
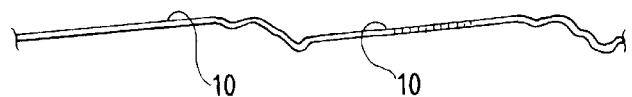
FIG. 2 is a partially broken-away side view of a plurality of the molded wood composite skirting boards, as shown in FIG. 1, as molded and interconnected, showing adjacent skirting boards interconnected through molded, wood composite board transition zones, where cuts are made to separate adjacent boards.

In the preferred embodiment shown in the drawings, the molded wood composite articles of the present invention are molded in the form of multiple, interconnected skirting boards to be adhered to a planar interior wall, extending upwardly from a floor, to simulate solid, natural wood skirting board millwork. It should be understood, however, that the principles of the present invention apply to much more than the manufacture of skirting board and also applies to the manufacture of crown moldings, as well as any molded, man-made composite wood article that includes one or more molded, decorative, contoured millwork designs, e.g., architrave, dados, and the like.

The dimensions of the molded wood composite articles of the present invention preferably varies from 3 inches to 9 inches in width and from 4 feet to 8 feet in length, and can be made in various widths, e.g., 3½ inches, 4½ inches, 5 inches, 5½ inches, 6 inches, and wider.

The articles of the present invention preferably are formed from at least 80% by weight fibrillated cellulosic fibers, based on the total, dry weight of fibers in the articles, and a binder capable of adhering the cellulosic fibers together into a structurally stable, consolidated article. The cellulosic fibers are in the form of refined, fibrillated fibers and can be molded and adhered together with natural or synthetic binders to provide one or more aesthetically pleasing molded contours, and smooth or wood grain texture in all exterior, visible surfaces. The articles of the present invention can be molded as a thin, e.g., 0.1 to 0.5 inch, preferably 0.1 to 0.3 inch individual skirting boards, from interconnected, multiple skirting boards that emerge from the press interconnected, and are separated to form the individual skirting boards by cutting or back sanding to provide a raised, hand-crafted, natural wood millwork look adhered to any planar surface.

Figure 1:
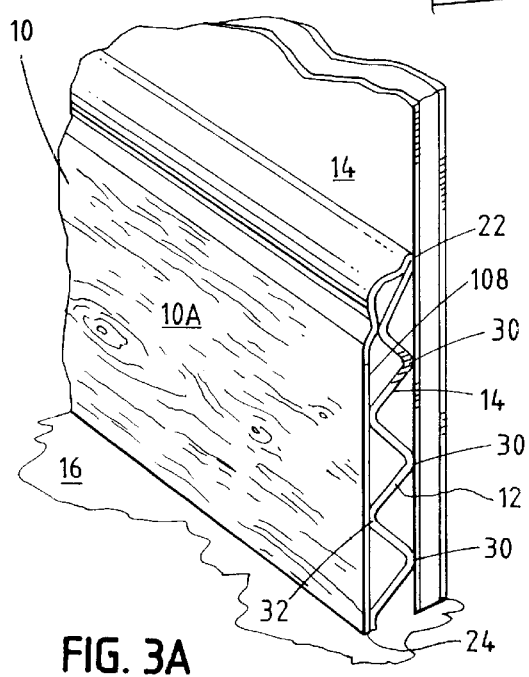
FIG. 1 is a partially broken-away perspective view of the preferred, molded wood composite skirting (base) board, including an inner, corrugated strengthening/positioning rib, manufactured in accordance with the present invention, installed against an interior room wall.
Figure 4:
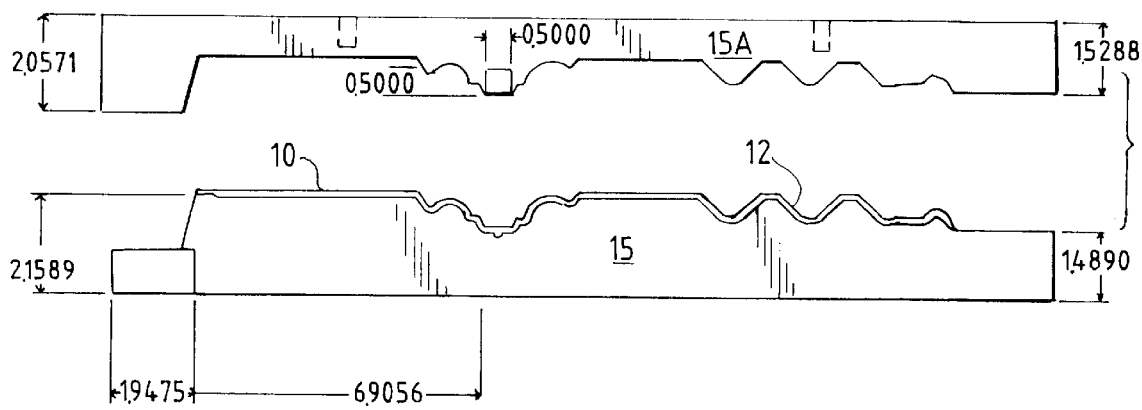
FIG. 4 is a side view of a machine steel upper mold core die and a machine steel lower mold cavity die for hot-pressing a loose mat of cellulosic fibers and a binder into the molded wood articles of the present invention.

Turning now to the drawings, and initially to FIG. 1, there is illustrated a partially broken-away perspective view of a portion of a preferred molded skirting board 10 including a preferred corrugated positioning/strengthening member 12 that contacts and is adhered to a vertical wall 14. The skirting board 10 is molded in multiple interconnected parts that are preferably 8 feet long and 3 to 9 inches in width, in a machine steel core/cavity die set with 8 feet being a typical length, including a contoured lower mold cavity die 15 and a correspondingly contoured upper mold core die 15A to provide multiple, interconnected skirting boards 10, as shown in FIG. 4. The upper mold core die 15A is essentially the same in general contour as an outer surface of the skirting board 10, and the lower mold cavity die 15 is slightly smaller horizontally, to allow for the thickness of the molded cellulosic mat that is molded between upper and lower dies 15 and 15A to provide the design best shown in FIGS. 1 and 2. The upper mold core die 15A is dimensioned complementary to the outer surface 10A of the skirting board 10, and the inner, mat-contacting surface can be smoothly contoured or can include downwardly extending structure (not shown) to emboss simulated wood grain ticks into the mat to form a wood grain pattern on an exterior surface 10A of the skirting board 10, as best shown in FIGS. 1 and 8.

The skirting board 10 is molded in a generally horizontal disposition (FIGS. 3 and 4) so that the upper major surface 10A will be described as horizontal—corresponding to its disposition during molding—and it will be recognized that the position of the molded article, in use, is usually intended to be vertical, instead of horizontal, as in the case of skirting board 10, as shown in FIGS. 1, 6, 7, and 8. The molded outer major surface 10A of the skirting board 10 is disposed in a vertical orientation extending along a wall, upwardly from a floor 16, as best shown in FIGS. 2 and 8.

The articles of the present invention are molded from a loose mat of cellulosic fibers and a thermosetting binder, such as a urea formaldehyde, melamine formaldehyde, and/or phenol formaldehyde binder commonly used in the manufacture of fiberboard. The mat should include at least about 80% fibrillated, refined cellulosic fibers, preferably 100%, based on the total, dry fiber weight in the mat 5. The fibers are mechanically refined from wood chips preferably using steam pressures in the range of about 80 to 120 psi, more preferably about 100 to 110 psi, most preferably about 105 psi. Steam pressures higher than about 120 psi in refining the cellulosic fibers produce highly refined fibers that are useful in accordance with the present invention, but the cost of refining would be commercially prohibitive.

Such refining of cellulosic fibers will provide fibrillated cellulosic fibers that are preferably dry laid into a loose cellulosic fiber mat having a basis weight in the range of 0.58 to 0.62 pounds per cubic inch. Upon molding in a heated press at a temperature in the range of about 385° F. to 450° F., and at a maximum pressure in the range of about 550 to about 850 psi, the resulting embossed articles will have a specific gravity in the range of about 0.96 to about 1.08, preferably about 0.98 to about 1.06, more preferably about 1.00 to about 1.04.

Figure 3A:
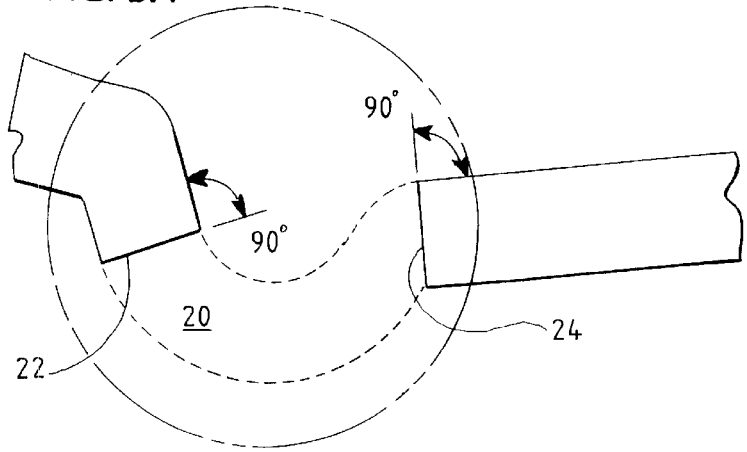
FIG. 3A is a partially broken-away, enlarged side view of the molded, wood composite transition zone of FIG. 3, interconnecting adjacent wood composite articles.
Figure 3:
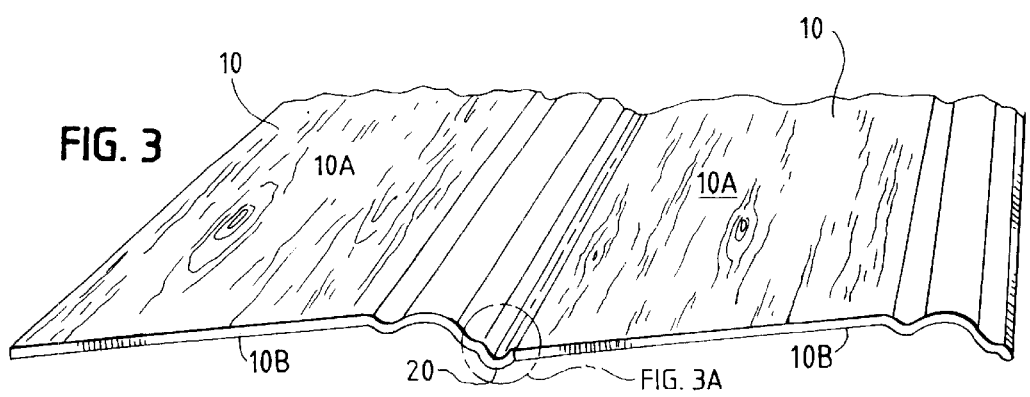
FIG. 3 is a partially broken away perspective view of a plurality of the molded wood composite skirting boards, as shown in FIG. 1, as molded and interconnected on a lower mold cavity die, after separation of the upper mold core die, showing adjacent skirting boards interconnected through molded, wood composite board transition zones, where cuts are made to separate adjacent boards.

The multiple skirting board profiles shown in FIGS. 2 and 3 correspond to the contour in the upper mold core die 15A and the lower mold cavity die 15, capable of molding multiple, interconnected skirting boards 10, interconnected through molded wood composite board transition zones 20, formed between every two adjacent skirting boards 10. As best shown in FIGS. 3 and 3A, the transition zones 20 preferably are molded as smoothly contoured arcs, e.g., 0.625 inch radius, that interconnect every two adjacent skirting boards so that each skirting board 10 can be easily separated from its interconnected, adjacent skirting board 10 by cutting to form an upper, right angle skirting board wall-contacting longitudinal edge 22 and a lower, right angle floor-contacting longitudinal edge 24. Alternatively, the transition zones 20 can be back sanded to weaken, or sand through, the transition zones 20 so that adjacent skirting boards 10 can be more roughly separated from each other, and the right angle cuts to form skirting board edges 22 and 24 can be made after separating the individual skirting boards 10.

The multiple skirting boards 10 are inexpensively molded preferably in a machine steel core/cavity die set to produce skirting boards 10 having a length of 8 feet and any desired width (height, as installed), such as 3¼ inches, 4½ inches, 5½ inches, 6 inch, 7 inch, or 9 inch widths. It should be understood, however, that molds of any desired length and width can be used to produce boards of greater lengths and widths in order to provide skirting boards 10 that are long enough to be installed against relatively long walls, without seams between adjacent boards on a given wall. Extant natural wood, millwork skirting boards that are relatively wide, e.g., 5 to 10 inches, are exponentially more expensive than the narrower skirting boards. The molding process of the present invention, on the other hand, provides skirting boards 10 of any desired width (height, as installed), and the wider (higher) skirting boards 10 will be only marginally more expensive than the narrower (shorter) boards 10, due to the fact that fewer wide boards are capable of being produced in a single pressing (molding). Where, in the past, wider, natural wood, millwork skirting boards could only be installed in very expensive, luxury homes, the process and product of the present invention, having the look and feel of natural wood, can be inexpensively installed in any home.

Figure 5:
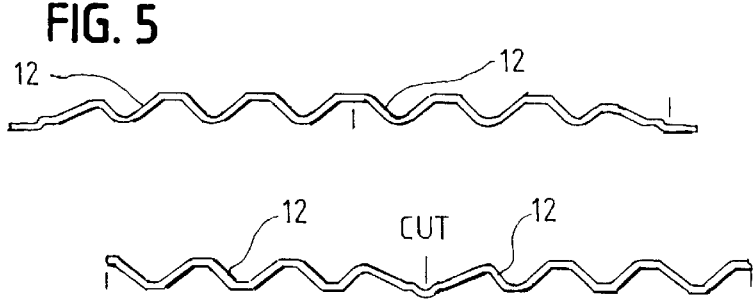
FIG. 5 is a partially broken-away side view of a plurality of molded, wood composite, corrugated strengthening/positioning ribs used to secure the skirting board to a wall or ceiling.

The skirting boards 10 can be installed over existing skirting boards, as shown in FIG. 8, or can be installed as an original skirting board, as shown in FIGS. 1, 6, and 7. Original skirting boards 10 should include a strengthening/positioning member, such as the corrugated stiffening rib 12, shown in FIGS. 1 and 5, to strengthen the skirting board, in position, and to position the floor-contacting edge 24 of skirting board 10 such that the outer surface 10A of the skirting board remains vertical over its entire height. As shown in FIG. 5, corrugated stiffening ribs 12 can be molded in multiple, interconnected pieces in the same way described for molding the skirting board 10. Multiple molded stiffening/positioning ribs 12 are molded to the same length as the skirting boards 10, and properly dimensioned such that the ribs 12 have inner corrugation apexes 30 (FIG. 1) that lie in the same plane and contact wall 14; and outer corrugation apexes 32 (FIG. 1) lie in the same plane and contact an inner surface 10B of the skirting board 10; while the upper, wall-contacting edge 22 of the skirting board 10 contacts the wall 14 over the entire right angle edge 22.

The properly dimensioned, corrugated stiffening ribs 12 permanently maintain the skirting boards 10 in vertical position, spaced from the wall 14; provide elongated channels between the wall 14 and the skirting board 10 for positioning and covering conduits, electrical wires, and the like; and provide sufficient strength and impact resistance over high spans to provide the feel and look of natural wood millwork. Corrugated stiffening/positioning ribs 12 may be first fixed to the wall 14 by gluing in place or nailing at inner apexes 30, and the skirting boards then can be affixed to the ribs 12, preferably by gluing. Alternatively, the corrugated stiffening/positioning ribs 12 may be first affixed to the inner surface 10B of the skirting board 10, and the assembled skirting board 10 and attached corrugated stiffening/positioning rib 12 glued or nailed to the wall 14 and floor 16. If nailed in place, nail holes can be filled prior to painting/staining or otherwise finishing the outer surface 10A of the skirting board 10. Advantageously, the skirting boards 10 and the stiffening/positioning ribs 12 can be transported assembled together, as shown in FIG. 1, before or after being fastened together, thereby saving space during transportation and saving transportation costs.

Alternatively, instead of using the stiffening/positioning ribs 12, an L-shaped positioning bracket 36 (FIGS. 6 and 7) can be used to properly position the floor-contacting edge 24 of the skirting board 10 to the floor such that the outer surface 10A of the skirting board 10 is vertically aligned. As shown in FIG. 6, the positioning bracket 36 can be positioned spaced from the wall 14 and extending outwardly from the floor-contacting edge 24 of the skirting board 10, so that the bracket 36 can be easily nailed to the floor on the room side of the skirting board 10 prior to adhesively securing a lower portion of the skirting board 10 to the positioning bracket 36. Optionally, quarter round molding 38, properly notched or routed along lower edge 40 to receive a portion of positioning bracket 36 that extends outwardly from outer surface 10A of the skirting board 10, will cover the outwardly protruding portion of the positioning bracket 36.

As shown in FIG. 7, the positioning bracket 36 also can be positioned against wall 14 so that the bracket 36 is entirely hidden by the skirting board 10. Brackets positioned against wall 14, as shown in FIG. 7, are more difficult to nail to the floor 14, but eliminate the need for the notched quarter round moldings 38 (FIG. 6) since the bracket is disposed entirely between wall 14 and the inner surface 10B of skirting board 10.

As shown in FIG. 8, inexpensive natural wood block-type corner moldings 40, presently available at home centers, can be positioned at inside and outside wall corners to provide a decorative appearance to the skirting board 10. As shown in FIG. 8, side edges of the skirting board 10 are abutted flush against a planar edge of the corner moldings 40. Similarly, if a room requires more than one length of skirting board 10 to span a length of wall, a rectangular block (not shown), similar to the corner blocks 40, can be symmetrically disposed between two lengths of skirting board 10, or the adjacent skirting board lengths can be abutted flush against each other, or a shiplap seam can be formed where two free ends of the adjacent skirting boards 10 meet. Further, as shown in FIG. 8, a rigid foam material, such as a rigid polyurethane foam 41, can be disposed between the back surface 10B of the skirting board 10 and the wall 14 to strengthen the skirting board 10, and position the skirting board 10 to maintain the planar portion of the skirting board 10 parallel to wall 14. The foam 41 can be pre-molded to conform to the shape defined by the space between the skirting board 10 and wall 14, or can be molded in place on the back surfaces 10B of the skirting boards 10.

The foregoing description is given for clearness of understanding only, and no unnecessary limitations should be understood therefrom, as modifications within the scope of the invention may be apparent to those skilled in the art.

What is claimed is:

1. A wood composite article, simulating natural wood millwork, molded from a mat of refined cellulosic fibers and sufficient binder to adhere the cellulosic fibers together into a structurally sound article having specific gravity in the range of 0.96 to about 1.08, said article including first and second planar longitudinal edges at opposite ends of said article adapted to contact a substrate, said first planar edge being integral with a planar portion of said article, and said second planar edge being integral with a contoured portion of said article, said planar portion of said article being integral with said contoured portion of said article.

2. A wood composite article in accordance with claim 1, wherein the article includes less than 5% by weight resin binder.

3. A wood composite article in accordance with claim 2, wherein the resin binder is homogeneously distributed throughout the article.

4. A wood composite article in accordance with claim 3, wherein the article does not include a thermoplastic coating material on the cellulosic mat, and does not include a resin-impregnated paper overlay.

5. A wood composite article in accordance with claim 1, wherein the mat of cellulosic fibers is made by the dry process and the article has a smooth planar back surface corresponding to said planar portion, and has a smooth contoured back surface corresponding to said contoured portion.

6. A wood composite article in accordance with claim 5, further including a corrugated rib secured to said planar back surface for contact against a planar substrate to space said planar portion of said article from a planar substrate, while contacting said planar substrate with an end edge adjacent said contoured portion of said article.

7. A wood composite article in accordance with claim 6, wherein the corrugated rib is adhered to said planar back portion of said article by fasteners or an adhesive.

8. A wood composite article in accordance with claim 1 wherein said planar portion of said article is secured in place at a right angle to said planar substrate by fastening said planar portion of said article to an L-shaped bracket and wherein said bracket is fastened to said planar substrate.

9. A wood composite article in accordance with claim 1, wherein the cellulosic mat includes at least 40% by weight softwood fibers, based on the total weight of cellulosic fibers in the article.

10. A wood composite article in accordance with claim 6, wherein the corrugated rib is molded from a mat of refined cellulosic fibers and a binder.

11. A wood composite article in accordance with claim 1, wherein the planar substrate is an interior room wall.

12. A wood composite article in accordance with claim 11, wherein said first planar substrate-contacting edge is cut at a right angle that is in contact with an interior room floor, and the second planar substrate-contacting edge is cut at a right angle that is in contact with the interior room wall, such that an outer surface of said planar portion of the article is parallel to said wall.

13. A molding kit comprising a wood composite article in accordance with claim 1, and a corrugated strengthening rib having the same length as said wood composite article, said corrugated strengthening rib having spaced inner and outer corrugation apexes that are dimensioned such that with outer corrugation apexes of the strengthening rib in contact with an inner surface of a planar portion of said wood composite article, and with inner corrugation apexes of said strengthening rib in contact with a first planar substrate that is at a right angle to a second planar substrate, one longitudinal edge of said wood composite article is in contact with and at a right angle to said first planar substrate, and another longitudinal edge of said wood composite article is in contact with said second planar substrate.

14. A molding kit comprising a wood composite article in accordance with claim 1, and an L-shaped positioning bracket adapted to be positioned in contact with and fastened to an inner surface of a planar portion of said wood composite article, and fastened to a first planar substrate that is at a right angle to a second planar substrate such that one longitudinal edge of said wood composite article is in contact with and at a right angle to said first planar substrate, and another longitudinal edge of said wood composite article is in contact with said second planar substrate.

15. A molding kit in accordance with claim 14, further including an elongated notched quarter round molding strip that is molded from refined cellulosic fibers or is natural wood, said molding strip including a notch along the entire length thereof for receiving a portion of said L-shaped positioning bracket protruding from underneath the wood composite article.

16. A method of manufacturing a molded wood composite article comprising:
    disposing a mat of cellulosic fibers and a resin binder over an essentially horizontal lower mold cavity die having first and second ends and multiple, repeating planar surface portions and multiple, repeating contoured surface portions extending between said first and second ends that form a cavity in said die; and
    pressing said mat between said cavity die and mold core die that has planar and contoured surface portions corresponding to the planar and contoured cavity die surfaces, under sufficient heat and pressure to structurally consolidate the mat into a multiple of wood composite articles, having a specific gravity of about 0.96 to about 1.08, in a single pressing and being separable along surface portions corresponding to said cavity die contoured surface portions.

17. A method in accordance with claim 16, wherein the article includes less than 5% by weight thermosetting resin binder.

18. A method in accordance with claim 17, wherein the resin binder is homogeneously distributed throughout the article.

19. A method in accordance with claim 13, wherein the article does not include a thermoplastic coating material on the cellulosic mat, and does not include a resin-impregnated paper overlay.

20. A method in accordance with claim 16, wherein the mat of cellulosic fibers is made by the dry process and the article has a smooth planar back surface corresponding to said planar portion, and has a smooth contoured back surface corresponding to said contoured portion.

21. A method in accordance with claim 16, further including adhering a corrugated rib to a back surface of said article, said rib adapted to contact a planar substrate at multiple apexes of the corrugations, while opposed longitudinal end edges are in contact with a wall and a floor or a wall and a ceiling.

22. A method in accordance with claim 21, wherein the corrugated rib is adhered to said planar back portion of said article by fasteners or an adhesive.

23. A method in accordance with claim 21, wherein the corrugated rib is adhered to said wall by fasteners or an adhesive.

24. A method in accordance with claim 16, wherein said planar portion of said article is secured in place at a right angle to a planar substrate by fastening said planar portion of said article to an L-shaped bracket and wherein said bracket is fastened to said planar substrate.

25. A method in accordance with claim 16, wherein the cellulosic mat includes at least 40% by weight softwood fibers, based on the total weight of cellulosic fibers in the article.

26. A method in accordance with claim 21, further including the step of molding said corrugated rib from a mat of refined cellulosic fibers and a binder.

27. A method in accordance with claim 26, wherein said corrugated rib is molded between a mold die cavity and a mold die core in multiple, identical, interconnected ribs pressed from a single pressing.

28. A method in accordance with claim 26, wherein the cellulosic fibers are about 100% softwood fibers.

29. A method in accordance with claim 26, wherein the cellulosic fibers are about 30–60% by weight softwood fibers and 40–70% hardwood fibers.

30. A method in accordance with claim 26, wherein the cellulosic fibers are about 100% hardwood fibers.

31. A method in accordance with claim 22, wherein the corrugated rib is adhered to the planar substrate prior to adhering the article to said corrugated rib.

32. A method in accordance with claim 24, wherein the planar substrate is an interior room wall.

33. A method in accordance with claim 16, further including the steps of disposing the molded wood composite article adjacent a wall or ceiling such that the planar portion of said molded wood composite article is parallel to said wall or ceiling, and then filling a space between a back surface of said wood composite article and said wall or ceiling with a foam material.

34. A method of manufacturing a molded wood composite article comprising:
    disposing a mat of cellulosic fibers and a resin binder over an essentially horizontal lower mold cavity die having multiple, repeating planar surface portions and multiple, repeating contoured surface portions that form a cavity in said die; and
    pressing said mat between said cavity die and mold core die that has planar and contoured surface portions corresponding to the planar and contoured cavity die surfaces, under sufficient heat and pressure to structurally consolidate the mat into a multiple of wood composite articles, having a specific gravity of about 0.96 to about 1.08, in a single pressing; and
    separating the plurality of articles into individual articles.

35. The method of claim 34 the step of separating the plurality of articles into individual articles comprises the step of separating the plurality of articles into individual articles having the same size and shape.

* * * * *